Figure 1:
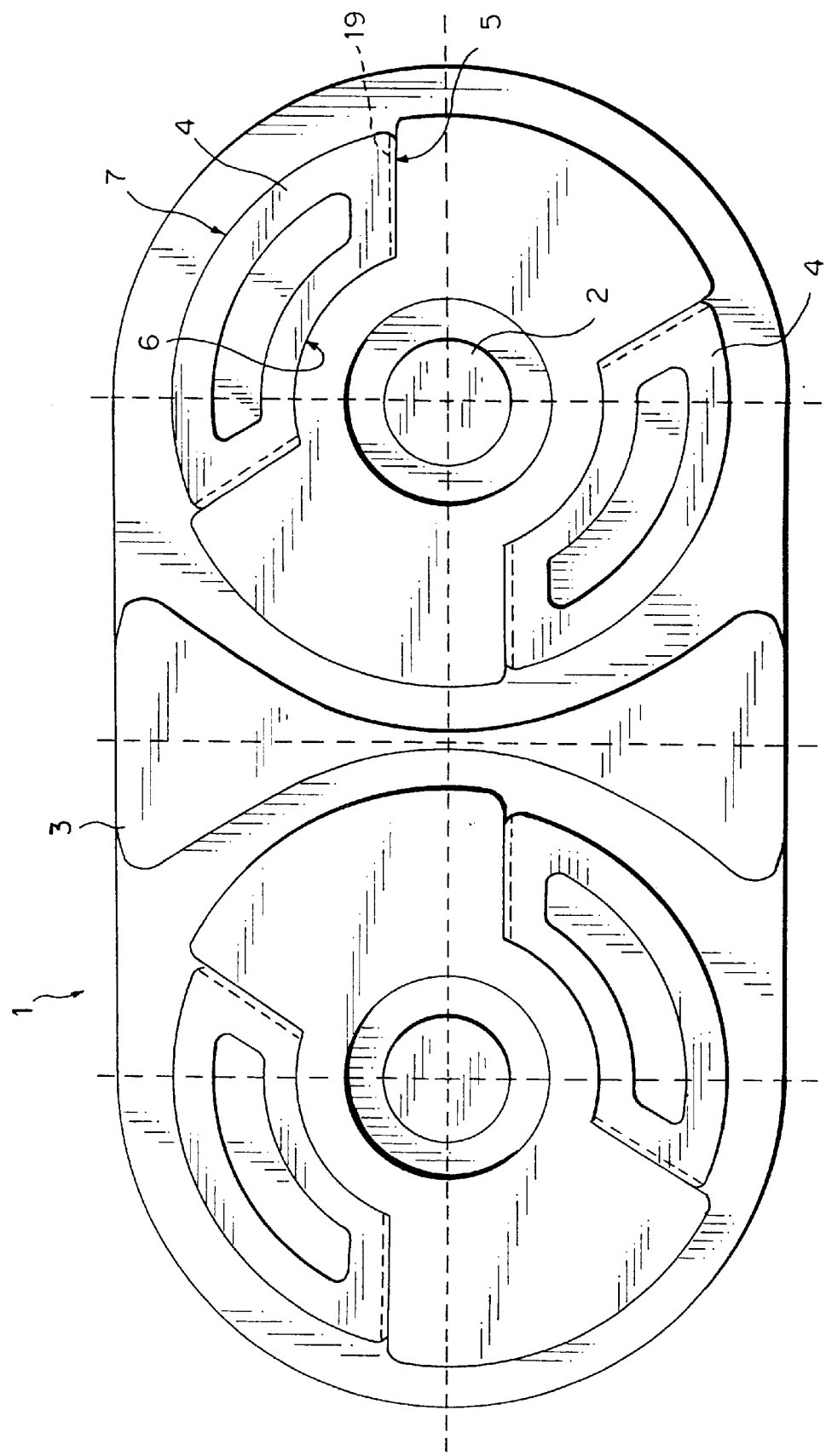

United States Patent [19]
Blase

[11] Patent Number: 5,987,873
[45] Date of Patent: Nov. 23, 1999

[54] POWER GUIDE CHAIN

[75] Inventor: Günter Blase, Bergisch Gladbach, Germany

[73] Assignee: Igus Spritzgussteile für die Industrie GmbH, Köln, Germany

[21] Appl. No.: 08/981,271

[22] PCT Filed: Apr. 8, 1997

[86] PCT No.: PCT/DE97/00726

§ 371 Date: May 1, 1998

§ 102(e) Date: May 1, 1998

[87] PCT Pub. No.: WO97/40288

PCT Pub. Date: Oct. 30, 1997

[30] Foreign Application Priority Data

Apr. 22, 1996 [DE] Germany ............... 296 07 171 U

[51] Int. Cl.⁶ ................................................. F16G 13/16
[52] U.S. Cl. ........................... 59/78.1; 59/900; 248/49
[58] Field of Search .................. 59/78.1, 900; 248/49

[56] References Cited

U.S. PATENT DOCUMENTS 4,800,714  1/1989  Moritz ........................................ 59/78.1
5,771,676  6/1998  Komiya et al. ........................... 59/78.1

FOREIGN PATENT DOCUMENTS

| 0499784 | 8/1992 | European Pat. Off. . |
| 1574369 | 8/1971 | Germany . |
| 3333543 | 4/1985 | Germany . |
| 3531066 | 3/1987 | Germany . |
| 3928238 | 10/1990 | Germany . |
| 4105650 | 4/1992 | Germany . |
| 2186146 | 7/1990 | Japan . |
| 7280656 | 10/1995 | Japan . |

*Primary Examiner*—David Jones
*Attorney, Agent, or Firm*—Browdy and Neimark

[57] ABSTRACT

An energy guiding chain for guiding hoses and the like between two connecting points, the position of at least one of which can be changed, comprises several chain links comprising side elements and cross-members connected to each other in articulated fashion, where the pivoting of adjacent chain links relative to each other is limited by corresponding stops with contact surfaces arranged on the chain links. In order to allow a higher traversing speed and reduce the noise emission of the chain, the chain links are provided with means for reducing the angling speed of adjacent chain links relative to each other.

10 Claims, 2 Drawing Sheets

POWER GUIDE CHAIN

The invention relates to an energy guiding chain for guiding hoses and the like between two connecting points, the position of at least one of which can be changed, with several chain links comprising side elements and cross-members connected to each other in articulated fashion, where the pivoting of adjacent chain links relative to each other is limited by corresponding stops with contact surfaces arranged on the chain links.

The pivoting of the chain links relative to each other is limited, for example, when unsupported energy guiding chains are present, i.e. when the upper strand of the energy guiding chain does not rest on the lower strand during traversing of the chain, instead being guided at a vertical distance from it. On account of the limited pivoting of adjacent chain links relative to each other, the direction of movement of the energy guiding chain can only change up to a certain, design-specific bending radius. This bending radius must be matched to the design circumstances of the device to be equipped with an energy guiding chain, as well as to the flexibility of the energy lines, such as hoses and the like, to be accommodated in the energy guiding chain.

The pivoting of adjacent chain links relative to each other can be limited by stops provided especially for this purpose. However, the stops are generally understood as those areas of the chain links which come into contact with areas of the respective adjacent chain links when adjacent chain links are pivoted, thus limiting the pivoting of the chain links relative to one another.

The rapid traversing of energy guiding chains is often associated with considerable and irritating noise emission. The task of the present invention is to create an energy guiding chain which allows high traversing speeds and displays reduced noise emission.

According to the invention, the task is solved by providing the chain links with means for reducing the angling speed of adjacent chain links relative to each other. This results in the adjacent chair links being braked during angling relative to each other when pivoting the chain links, so that the corresponding stops come into contact with each other at a reduced speed, consequently reducing the emission of noise when the energy guiding chain is traversed. To this end, torsion springs connected to the respective adjacent side elements, for example, can be provided in the area of the joints.

In order to reduce the angling speed, the side elements are advantageously provided with run-up bevels, and the side elements of the respective adjacent chain links with areas which run up the run-up bevels when the chain links are pivoted, i.e. are guided along the run-up bevels over a range of pivoting angles, where the areas of the adjacent chain link provided with run-up bevels and/or the areas running up the run-up bevels display elastically deformable elements which can be deformed elastically when the chain links are pivoted. The elastic deformation of the elements when the areas of the adjacent chain link are guided on the run-up bevels when the chain links are pivoted causes the adjacent chain links to be braked relative to each other and results in a reduction of the impact speed of the stops. The extent of the damping effect in this context depends on the inclination and length of the run-up bevels, as well as on the elasticity of the elastically deformable elements.

The elastically deformable elements can be designed as separate spring elements or, given appropriate elasticity of the material of which the side elements are made, they can form areas of the side elements integrally moulded in one piece.

If the side elements are designed as mutually corresponding inner and outer straps displaying a thicker area protruding transversely to the longitudinal direction of the chain in the region of the centre plane, the run-up bevels can, for example, be arranged on the lateral limiting surfaces of the thicker areas or the areas of the adjacent chain link opposite these. Accordingly, if the side elements are cranked, the run-up bevels can be arranged in the region of the crank or on the outer circumference of the side elements facing the cranked area of the adjacent side wall. The run-up bevels can, for example, also be designed as tooth flanks or undulating profiles, where the areas of the adjacent chain link running up the run-up bevels can be designed as teeth which engage the teeth of the first chain link, with the tooth flanks having different inclinations or the undulations having different curvatures. The run-up bevels can also be integrated in the stops.

If the run-up bevels are inclined appropriately, the run-up height of the area running up the run-up bevel can increase disproportionally with the pivoting angle, so that the damping increases with increased angling of the chain links. The damping characteristics can thus be set by the contour of the run-up bevel.

The inclination of the run-up bevels, as well as the elastic deformability of the areas of the side elements provided with the run-up bevels, or of the areas of the adjacent chain link guided over these, are advantageously matched to each other in such a way that areas of the side elements provided with the run-up bevels act as elastic elements themselves and are made of a plastic material, which can also be used for the manufacture of the side elements. The side elements can thus be manufactured in one piece.

The run-up bevels are advantageously arranged essentially perpendicular to the respective side elements. The forces acting parallel to the main plane of the side elements during deformation of the elastic elements thus also act radially on the hinged connection, so that the damping of the pivoting movement of the chain links relative to each other can simultaneously lead to a reduction in the free play of adjacent chain links relative to each other, and even to tensioning of the chain links when the corresponding stops of adjacent chain links are in contact with each other. This leads to increased rigidity of the energy guiding chain. When the chain links are braked, force components which act on the side elements perpendicular to the direction of travel of the energy guiding chain are thus avoided.

The run-up bevels advantageously end at the level of the contact surfaces of the stops. This achieves a maximum reduction of the impact speed of the stops immediately before they come into contact with each other, as well as a simple design.

A simple design, which simultaneously guarantees good noise damping and a long service life of the energy guiding chain, is achieved if the areas running up the run-up bevels are designed as stops, whose lateral, i.e. radial inner and/or outer limiting surfaces, can be brought into contact with the run-up bevels. The stops can be designed as circular segments or also as essentially round stop pins in this context.

The stops can display arc-like lateral limiting surfaces, where the run-up bevels are designed as areas extending from an arc-like curve and running essentially tangential to this. This results in a design which is both simple to manufacture from the process-engineering viewpoint and which also allows the pivoting of the chain links to be increasingly damped when the chain links are pivoted to an increasing extent.

If the run-up bevels only extend over part of the angular range of the stops, the first part of the pivoting of the chain links relative to each other can occur without braking.

The joint of interconnected side elements of adjacent chain links is advantageously provided with at least two run-up bevels distributed around the circumference of the pivoting axis and areas of adjacent chain links guided over these. The reduction of the angling speed of the chain links relative to each other when the energy guiding chain is traversed is increased, thus further reducing the emission of noise. Furthermore, this allows the tensioning of adjacent chain links when the chain links are angled, without resulting in radial force components, so that the distribution of the run-up bevels around the pivoting axis reduces the load on the hinged connection of the chain links. The tensioning simultaneously reduces the free play of the chain links in the area of the joint, causing the side elements to be centred relative to the pivoting axis and thus reducing the wear in the area of the joint and preventing an increase in the pitch of the energy guiding chain, i.e. the length of the energy guiding chain per chain link. This leads to improved directional stability when the energy guiding chain is traversed.

The run-up bevels are advantageously arranged diametrically opposite each other in relation to the pivoting axis. However, three run-up bevels distributed evenly around the pivoting axis can also be envisaged, for example.

The stops are also advantageously provided with undercuts which can engage the corresponding stops. Lateral angling of the adjacent side elements relative to each other is thus prevented, as a result of which the stability of the energy guiding chain is increased.

The present invention is not limited to energy guiding chains made up of cranked side elements or of strands of side elements comprising alternating inner and outer straps. The concrete design of the side elements is, in fact, irrelevant as regards the invention. In this context, the side elements can be connected to the cross-members in detachable fashion or in one piece.

Figure 2:
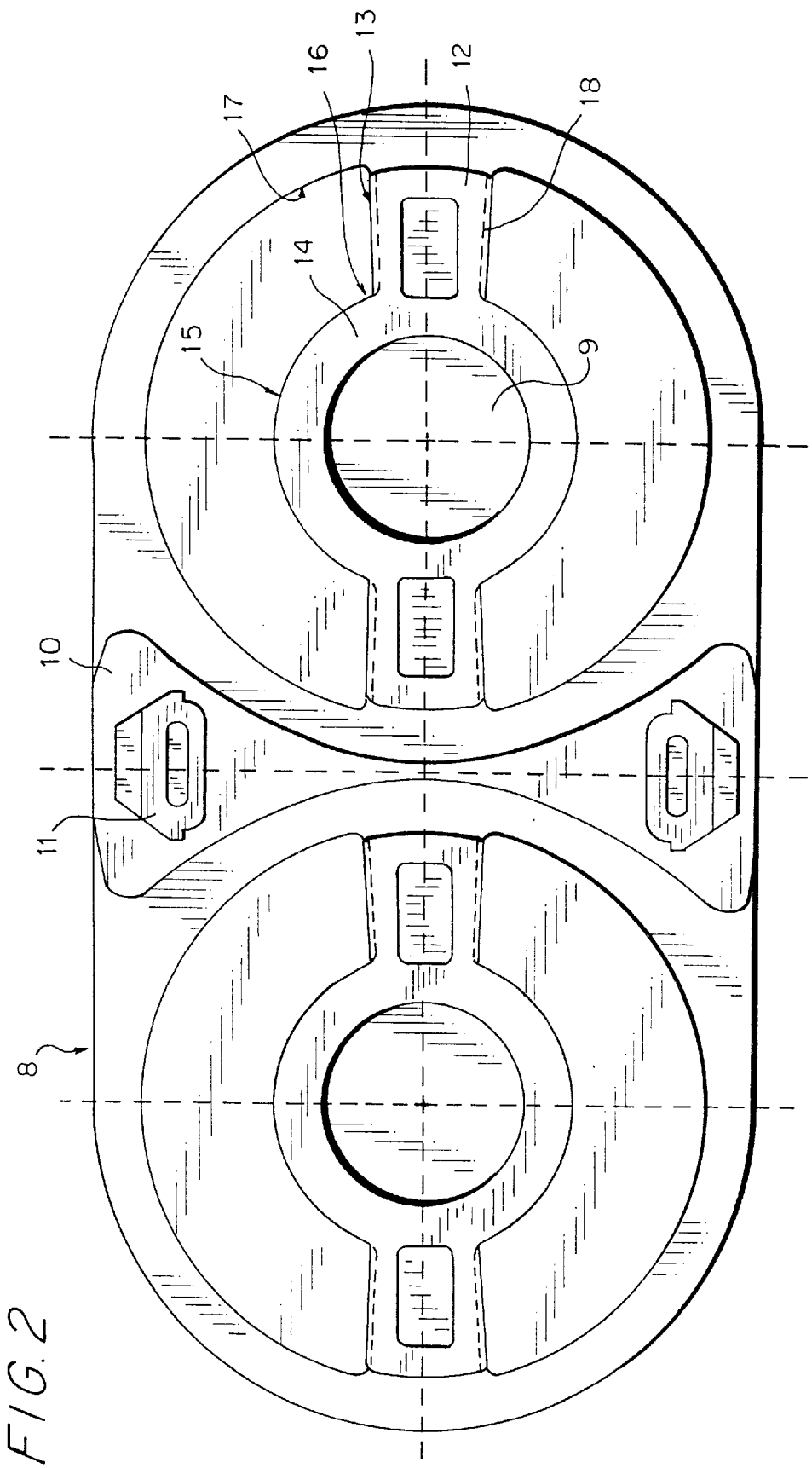

The invention is described below on the basis of an example and illustrated in the drawings. The drawings show the following:

FIG. 1 A side element of an energy guiding chain, designed as an inner strap,

FIG. 2 A side element designed as a corresponding outer strap of an energy guiding chain, with run-up bevels.

The side element of an energy guiding chain comprising strands of outer and inner straps arranged in alternating fashion, designed as an inner strap 1, is provided with two hinge pins 2, integrally moulded to form a single piece, which can be inserted in corresponding recesses in the adjacent chain link in order to join the chain links in an articulated arrangement. The mirror-symmetrical inner strap 1 is provided with a thicker area 3 at its centre, which is arranged in such a way that it faces laterally outwards from the energy guiding chain when the inner strap 1 is assembled. The areas of the inner strap 1 which overlap the corresponding outer straps are provided with two stops 4, which are arranged diametrically opposite each other relative to the pivoting axis running through the hinge pins 2 and are of circular segment-like design. The stops 4 display two plane contact surfaces 5 which can be brought into contact with corresponding stops on the adjacent side element in order to limit the pivoting angle of the chain links. The lateral limiting surfaces of the stop 4, arranged between the two contact surfaces 5, are designed in arc-like form, where the radially inner lateral limiting surface 6 displays a gap $d_1$ relative to the pivoting axis and the radially outer lateral limiting surface 7 displays a corresponding gap $d_2$.

The areas of the outer strap 8—illustrated in FIG. 2 and corresponding to the inner strap 1—which overlap the inner strap 1 display two recesses 9 in which the hinge-pins 2 of the adjacent inner straps 1 can be inserted. The outer straps 8, designed mirror-symmetrically about the longitudinal axis and about the centre plane of the side elements arranged perpendicular thereto, display thicker areas 10 provided with locking projections 11 protruding towards the inside of the chain, by means of which the inner straps can be interconnected with cross-members not presented in detail. The outer straps 2 are provided with two stops 12 in the area of the recesses 9, the plane contact surfaces 13 of which can be positioned against the stops 4 of the inner straps 1.

The edge 14 surrounding the recess 9 displays a gap $d_3$ relative to the pivoting axis at its radially outer limiting surface in the area 15, in the middle between the stops 12 which is slightly smaller than the gap $d_1$ of the radially inner limiting surface 6 of the corresponding stop 4. The stop 4 is thus guided with little free play in the area 15 when the adjacent side elements are pivoted around the edge 14. The distance of the edge 14 from the pivoting axis increases in the direction of the contact surfaces 13 of the stops 12 and runs from a circularly curved area into the area 16, designed tangentially to the area 15, which is located next to the stop 12 at a distance of $d_4$. In this context, the distance of the tangential area 16 in the area of the contact surface 13 is slightly larger than the distance $d_1$ of the limiting surface 6 of the stop 4 of the inner strap 1 corresponding to stop 12 On account of the symmetry of the outer strap, the same applies to the design of the lower area of the edge 14 in FIG. 2. The run-up bevels thus only display a slight gradient, i.e. of up to just a few degrees, relative to the direction of travel of the areas of the adjacent side element running up onto them, and are thus of comparatively flat design. Furthermore, the outer straps 8 display an edge 17 with a distance from the pivoting axis which is slightly greater than the distance $d_2$ of the radially outer limiting surface 7 of the stops 4, and thus surrounds the stops 4 with little free play.

When the inner straps 1 are pivoted against the outer straps 8, the inner limiting surface 6 of the stops 4 comes into contact with the tangential areas 16 of the edge 14 at a predefined pivoting angle. If the straps are pivoted further, the tangential areas 16 act as run-up bevels on which the stops 4 run up. In this context, both the tangential area 16 and the area of the limiting surface 6 in contact with this are subjected to elastic deformation on account of the elasticity of the material from which the one-piece outer and inner straps are manufactured. This causes the chain straps to be braked, so that the angling (angular) speed of the chain straps is reduced and the corresponding contact surfaces come into contact with each other at a lower speed. On account of the absorption of energy by the elastic elements, noise emission is decreased when the energy guiding chain is traversed. Because the effective length of the tangential areas is shorter than the length of the stops, the stops are not braked until having travelled a certain distance, this leading to uniform motion of the energy guiding chain.

It is also possible to provide the edge 17 with a run-up bevel projecting radially inwards, which can be brought into contact with the radially cuter limiting surface 7 of the stop 4 when the chain links are pivoted. However, arranging the tangential areas 16 acting as run-up bevels on the edge 14 has the advantage that this area travels at a lower circumferential speed than an area arranged radially further out, meaning that the corresponding areas of the inner and outer straps can travel relative to one another at lower relative speeds and the movement can be better braked, thus leading to a greater reduction in noise emission.

Because the edge 14 is provided with two pairs of run-up bevels 16 diametrically opposite the pivoting axis which can be brought into contact with corresponding areas of the corresponding stops 4 under elastic deformation, and thus tensioned, the radially outwards acting forces of the deformed areas cancel each other out, with the result that no additional radial forces act on the hinged connection, which would otherwise cause increased wear. Instead, the outer straps 8 are tensioned together with the inner straps 1, so that the play of the straps relative to each other is reduced when increasingly approaching the corresponding stops 4 and 12, and is minimised when the stops 4 and 12 contact each other. The wear in the area of the chain link joint is thus markedly reduced, and the directional stability increased when the energy guiding chain is traversed.

Furthermore, the stops 12 are provided with undercuts 18 which can engage with the stops 4 provided with bevels 19, thus preventing lateral angling of adjacent chain links relative to each other.

Because the tangential areas 16 acting as run-up bevels extend over a greater angular range around the pivoting axis, a clear and uniform reduction in the angling speed of adjacent side elements relative to each other is possible, even if the run-up bevels are not very high, and noise emission is thus also markedly reduced.

| Reference numbers | |
|---|---|
| 1 | Inner strap |
| 2 | Hinge pin |
| 3 | Thicker area |
| 4 | Stop |
| 5 | Contact surface |
| 6 | Limiting surface |
| 7 | Limiting surface |
| 8 | Outer strap |
| 9 | Recess |
| 10 | Thicker area |
| 11 | Locking projection |
| 12 | Stop |
| 13 | Contact surface |
| 14 | Edge |
| 15 | Circular area |
| 16 | Tangential area |
| 17 | Edge |
| 18 | Undercut |
| 19 | Bevel |

I claim:

1. An energy guiding chain for guiding hoses and the like between two connecting points, wherein a position of at least one of the connecting points is changeable, the chain including chain links each comprising side elements and cross-members coupled to each other for articulation therebetween;

the links being pivotable relative to each other, pivoting of adjacent chain links being limited by corresponding stops including contact surfaces disposed on the chain links;

adjacent chain links comprising a brake operating over a pivoting angle to reduce an angular speed of the adjacent chain links relative to each other prior to engagement of the corresponding stops, the brake including a run-up bevel on a first side element of a first chain link and an area which runs up the run-up bevel on a second side element of an second chain link adjacent to the first chain link, wherein at least one of the run-up bevel and the area which runs up the run-up bevel includes an elastically deformable element which deforms elastically when the adjacent chain links are pivoted, and wherein the elastically deformable element is made of the same material as the corresponding side element and is made in one piece with the corresponding side element.

2. The energy guiding chain according to claim 1, wherein the run-up bevel is perpendicular to the corresponding side element.

3. The energy guiding chain according to claim 1, wherein the run-up bevel ends at a stop contact surface.

4. The energy guiding chain according to claim 1, wherein one of the stops comprises the area which runs up the run-up bevel, and at least one lateral limiting surface of the one of the stops is disposed to be brought into contact with the run-up bevel.

5. The energy guiding chain according to claim 1, wherein the stops comprise generally cylindrical lateral surfaces and the run-up bevel comprises an area essentially tangential to one of the lateral surfaces.

6. The energy guiding chain according to claim 5, wherein the run-up bevel extends angularly over only a portion of an angular length of the stops.

7. The energy guiding chain according to claim 1, wherein the run-up bevel extends angularly over only a portion of an angular length of the stops.

8. The energy guiding chain according to claim 1, wherein the side elements of adjacent chain links, which are coupled to each other for articulation therebetween about a pivoting axis, include at least two run-up bevels distributed around a circumference of the pivoting axis and corresponding areas which run up the run-up bevels.

9. The energy guiding chain according to claim 8, wherein the run-up bevels are disposed diametrically opposite one another across the pivoting axis.

10. The energy guiding chain according to claim 1, wherein the stops comprise undercuts engageable by corresponding other stops.

* * * * *